United States Patent
Sakamine et al.

(10) Patent No.: US 9,283,439 B2
(45) Date of Patent: Mar. 15, 2016

(54) GOLF BALL

(71) Applicant: Dunlop Sports Co. Ltd., Kobe-shi, Hyogo (JP)

(72) Inventors: Ryota Sakamine, Kobe (JP); Chiemi Mikura, Kobe (JP); Ayaka Shindo, Kobe (JP)

(73) Assignee: DUNLOP SPORTS CO., LTD., Kobe-shi (JP)

( * ) Notice: Subject to any disclaimer, the term of this patent is extended or adjusted under 35 U.S.C. 154(b) by 44 days.

(21) Appl. No.: 14/158,325

(22) Filed: Jan. 17, 2014

(65) Prior Publication Data

US 2014/0206476 A1    Jul. 24, 2014

(30) Foreign Application Priority Data

Jan. 21, 2013   (JP) .................. 2013-008547

(51) Int. Cl.
*A63B 37/00*    (2006.01)
*A63B 37/02*    (2006.01)
*C08K 5/45*    (2006.01)

(52) U.S. Cl.
CPC ......... *A63B 37/0054* (2013.01); *A63B 37/0063* (2013.01); *A63B 37/0092* (2013.01); *A63B 37/0007* (2013.01); *A63B 37/0018* (2013.01); *A63B 37/0074* (2013.01); *A63B 37/0075* (2013.01); *A63B 37/0076* (2013.01); *A63B 37/0096* (2013.01); *A63B 2037/0079* (2013.01); *C08K 5/45* (2013.01)

(58) Field of Classification Search
None
See application file for complete search history.

(56) References Cited

U.S. PATENT DOCUMENTS

| 5,403,010 A | 4/1995 | Yabuki et al. |
| 5,834,546 A * | 11/1998 | Harris et al. .................. 524/320 |
| 2006/0135287 A1 | 6/2006 | Kennedy, III et al. |
| 2007/0173607 A1 | 7/2007 | Kennedy, III et al. |
| 2008/0194357 A1 | 8/2008 | Higuchi |
| 2008/0194359 A1 | 8/2008 | Higuchi et al. |
| 2008/0214324 A1 | 9/2008 | Nanba et al. |
| 2009/0124757 A1 | 5/2009 | Shindo et al. |
| 2010/0273575 A1 | 10/2010 | Watanabe |
| 2012/0329574 A1 * | 12/2012 | Mikura et al. ................ 473/372 |

FOREIGN PATENT DOCUMENTS

| JP | 61-113475 A | | 5/1986 |
| JP | 61-253079 A | | 11/1986 |
| JP | 61-37178 A | | 2/1988 |
| JP | 6-154357 A | | 6/1994 |
| JP | 2002078825 | * | 3/2002 |
| JP | 2008-523952 A | | 7/2008 |
| JP | 2008-194471 A | | 8/2008 |
| JP | 2008-194473 A | | 8/2008 |
| JP | 2008-212681 A | | 9/2008 |
| JP | 2009-119256 A | | 6/2009 |
| JP | 2010-253268 A | | 11/2010 |

* cited by examiner

*Primary Examiner* — David Buttner
(74) *Attorney, Agent, or Firm* — Birch Stewart Kolasch & Birch LLP (57) ABSTRACT

An object of the present invention is to provide a golf ball showing a low spin rate on driver shots. The present invention provides a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a carboxylic acid having a heterocyclic ring and/or a salt thereof, provided that the rubber composition further contains (e) a metal compound in case of containing only (b) the α,β-unsaturated carboxylic acid having 3 to 8 carbon atoms as the co-crosslinking agent.

11 Claims, 4 Drawing Sheets

GOLF BALL

FIELD OF THE INVENTION

The present invention relates to a golf ball having a low spin rate on driver shots, in particular, an improvement of a core of a golf ball.

DESCRIPTION OF THE RELATED ART

As a method for improving a flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

For example, Japanese Patent Publications Nos. S61-37178 A, S61-113475 A, S61-253079 A, 2008-212681 A, 2008-523952 T and 2009-119256 A disclose a technique of enhancing resilience of the core. Japanese Patent Publications Nos. S61-37178 A and S61-113475 A disclose a solid golf ball having an inner core where zinc acrylate as a co-crosslinking agent, palmitic acid, stearic acid, or myristic acid as a co-crosslinking activator, zinc oxide as another co-crosslinking activator, and a reaction rate retarder are blended, with respect to 100 parts by weight of a rubber.

Japanese Patent Publication No. S61-253079 A discloses a solid golf ball formed from a rubber composition containing an $\alpha,\beta$-unsaturated carboxylic acid in an amount of 15 parts to 35 parts by weight, a metal compound to react with the $\alpha,\beta$-unsaturated carboxylic acid and form a salt thereof in an amount of 7 parts to 60 parts by weight, and a high fatty acid metal salt in an amount of 1 part to 10 parts by weight with respect to 100 parts by weight of a base rubber.

Japanese Patent Publication No. 2008-212681 A discloses a golf ball comprising, as a component, a molded and crosslinked product obtained from a rubber composition essentially comprising a base rubber, a filler, an organic peroxide, an $\alpha,\beta$-unsaturated carboxylic acid and/or a metal salt thereof, a copper salt of a saturated or unsaturated fatty acid.

Japanese Patent Publication No. 2008-523952 T discloses a golf ball, or a component thereof, molded from a composition comprising a base elastomer selected from the group consisting of polybutadiene and mixtures of polybutadiene with other elastomers, at least one metallic salt of an unsaturated monocarboxylic acid, a free radical initiator, and a non-conjugated diene monomer.

Japanese Patent Publication No. 2009-119256 A discloses a method of manufacturing a golf ball, comprising preparing a masterbatch of an unsaturated carboxylic acid and/or a metal salt thereof by mixing the unsaturated carboxylic acid and/or the metal salt thereof with a rubber material ahead, using the masterbatch to prepare a rubber composition containing the rubber material, and employing a heated and molded product of the rubber composition as a golf ball component, wherein the masterbatch of the unsaturated carboxylic acid and/or the metal salt thereof comprises: (A) from 20 wt % to 100 wt % of a modified polybutadiene obtained by modifying a polybutadiene having a vinyl content of from 0 to 2%, a cis-1,4 bond content of at least 80% and active terminals, the active terminal being modified with at least one type of alkoxysilane compound, (B) from 80 wt % to 0 wt % of a diene rubber other than (A) the above rubber component [the figures are represented by wt % in the case that a total amount of (A) and (B) equals to 100 wt %], and (C) an unsaturated carboxylic acid and/or a metal salt thereof.

For example, Japanese Patent Publications Nos. H6-154357 A, 2008-194471 A, 2008-194473 A and 2010-253268 A disclose a core having a hardness distribution. Japanese Patent Publication No. H6-154357 A discloses a two-piece golf ball comprising a core formed of a rubber composition containing a base rubber, a co-crosslinking agent and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organic sulfur compound, an unsaturated carboxylic acid or a metal salt thereof, an inorganic filler, and an antioxidant; the solid core has a deformation from 2.0 mm to 4.0 mm, when applying a load from an initial load of 10 kgf to a final load of 130 kgf, and has the hardness distribution shown in the following table.

TABLE 1

| Hardness distribution in solid core | Shore D harness |
|---|---|
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

Japanese Patent Publication No. 2008-194473 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organic sulfur compound, an unsaturated carboxylic acid or a metal salt thereof, and an inorganic filler; the solid core has a deformation from 2.0 mm to 4.0 mm, when applying a load from an initial load of 10 kgf to a final load of 130 kgf, and has the hardness distribution shown in the following table.

TABLE 2

| Hardness distribution in solid core | Shore D harness |
|---|---|
| Center | 25 to 45 |
| Region located 5 to 10 mm from center | 39 to 58 |
| Region located 15 mm from center | 36 to 55 |
| Surface (S) | 55 to 75 |
| Hardness difference between center and surface | 20 to 50 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)-(II) in JIS-C hardness units being within ±2; and the envelope layer, intermediate layer and cover have hardness which satisfy the condition: cover hardness>intermediate layer hardness>envelope layer hardness.

SUMMARY OF THE INVENTION

An object of the present invention is to provide a golf ball having a low spin rate on driver shots.

The present invention provides a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a carboxylic acid having a heterocyclic ring and/or a salt thereof, provided that the rubber composition further contains (e) a metal compound in case of containing only (b) the α,β-unsaturated carboxylic acid having 3 to 8 carbon atoms as the co-crosslinking agent. By adopting such construction as described above, the golf ball of the present invention has a spherical core having a higher degree of the outer-hard inner-soft structure where the surface hardness of the spherical core is higher than the center hardness thereof. It is expected that a golf ball which has a spherical core having a high degree of the outer-hard inner-soft structure has a low spin rate on driver shots and travels a great flight distance on driver shots.

The action provided by (d) the carboxylic acid having a heterocyclic ring and/or the salt thereof in the rubber composition used for the golf ball of the present invention, is considered as follows. The metal salt of (b) the α,β-unsaturated carboxylic acid having 3 to 8 carbon atoms blended in the rubber composition is considered to form an ion cluster in the core, thereby crosslinking the rubber molecular chain with metals. By blending (d) the carboxylic acid having the heterocyclic ring and/or the salt thereof into this rubber composition, (d) the carboxylic acid having the heterocyclic ring and/or the salt thereof exchange a cation with the ion cluster formed from the metal salt of (b) the α,β-unsaturated carboxylic acid having 3 to 8 carbon atoms, thereby breaking the metal crosslinking formed by the metal salt of the α,β-unsaturated carboxylic acid having 3 to 8 carbon atoms. This cation exchange reaction easily occurs at the core central part where the temperature is high, but less occurs toward the core surface. When molding a core, the internal temperature of the core is high at the core central part and decreases toward the core surface, since reaction heat from a crosslinking reaction of the rubber composition accumulates at the core central part. In other words, the breaking of the metal crosslinking by (d) the carboxylic acid having the heterocyclic ring and/or the salt thereof easily occurs at the core central part, but less occurs toward the surface. As a result, it is conceivable that since a crosslinking density in the core increases from the center of the core toward the surface thereof, the core hardness increases from the center of the core toward the surface thereof.

The present invention provides a golf ball having a low spin rate on driver shots.

DESCRIPTION OF THE PREFERRED EMBODIMENT

The golf ball of the present invention has a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a carboxylic acid having a heterocyclic ring and/or a salt thereof, provided that the rubber composition further contains (e) a metal compound in case of containing only (b) the α,β-unsaturated carboxylic acid having 3 to 8 carbon atoms as the co-crosslinking agent.

First, (a) the base rubber used in the present invention will be explained. As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having a cis-1,4 bond in a proportion of 40 mass % or more, more preferably 80 mass % or more, even more preferably 90 mass % or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene preferably includes one synthesized using a rare-earth element catalyst. When a neodymium catalyst, which employs a neodymium compound of a lanthanum series rare-earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}(100°\ C.)$) of 30 or more, more preferably 32 or more, even more preferably 35 or more, and preferably has a Mooney viscosity ($ML_{1+4}(100°\ C.)$) of 140 or less, more preferably 120 or less, even more preferably 100 or less, and most preferably 80 or less. It is noted that the Mooney viscosity ($ML_{1+4}(100°\ C.)$) in the present invention is a value measured according to JISK6300 using an L rotor under the conditions of: a preheating time of 1 minute; a rotor rotation time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase:tetrahydrofuran, and calculated by converting based on polystyrene standard.

Next, (b) the α,β-unsaturated carboxylic acid having 3 to 8 carbon atoms and/or the metal salt thereof will be explained. (b) The α,β-unsaturated carboxylic acid having 3 to 8 carbon atoms and/or the metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably further contains (e) a metal compound as an essential component. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination, (e) the metal compound may be used as an optional component.

The α,β-unsaturated carboxylic acid having 3 to 8 carbon atoms includes, for example, acrylic acid, methacrylic acid, fumaric acid, maleic acid, crotonic acid, and the like.

Examples of the metal constituting the metal salt of the α,β-unsaturated carboxylic acid having 3 to 8 carbon atoms include: a monovalent metal ion such as sodium, potassium, lithium or the like; a divalent metal ion such as magnesium, calcium, zinc, barium, cadmium or the like; a trivalent metal ion such as aluminum or the like; and other metal ion such as tin, zirconium or the like. The above metal ion can be used solely or as a mixture of at least two of them. Among these metal ions, the divalent metal ion such as magnesium, calcium, zinc, barium, cadmium or the like is preferable. Use of the divalent metal salt of the α,β-unsaturated carboxylic acid having 3 to 8 carbon atoms easily generates a metal crosslinking between the rubber molecules. Especially, as the divalent metal salt, zinc acrylate is preferable, because zinc acrylate enhances the resilience of the resultant golf ball. The α,β-unsaturated carboxylic acid having 3 to 8 carbon atoms and/or the metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the content of (b) the α,β-unsaturated carboxylic acid having 3 to 8 carbon atoms and/or the metal salt thereof is less than 15 parts by mass, the content of (c) the crosslinking initiator which will be explained below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, di-t-butyl peroxide or the like. The organic peroxide may be used solely or in combination at least two of them. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes so soft that the golf ball tends to have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, probably resulting in the insufficient resilience or lower durability of the golf ball.

The rubber composition used for the present invention contains (d) a carboxylic acid having a heterocyclic ring and/or the salt thereof. (d) The carboxylic acid having the heterocyclic ring has a heterocyclic structure and at least one carboxyl group directly bonding to the heterocyclic ring in a molecule thereof. In the present invention, the heterocyclic structure contains, as an atom forming the cyclic structure, a carbon atom and at least one atom other than carbon atom (hetero atom). The hetero atom in the heterocyclic structure can be one kind or two or more kinds. The hetero atom includes nitrogen atom, oxygen atom, sulfur atom or the like. Among them, oxygen atom or sulfur atom is preferred. The number of the hetero atom in the heterocyclic structure is not particularly limited, but preferably 2 or less, and more preferably 1.

The heterocyclic structure includes a monocyclic structure having a three-membered ring, four-membered ring, five-membered ring, six-membered ring, seven-membered ring or the like; a structure having a fused ring; or the like. Among them, the monocyclic structure is preferred, and the monocyclic structure having a four-membered ring, five-membered ring or six-membered ring is more preferred. The monocyclic structure having a three-membered ring includes, for example, ethylene imine, ethylene oxide, ethylene sulfide, 1H-azirine, 2H-azirine, acethylene oxide, acethylene sulfide or the like. The monocyclic structure having a four-membered ring includes, for example, azacyclobutane, 1,3-propylene oxide, trimethylene sulfide, azete or the like. The monocyclic structure having a five-membered ring includes, for example, pyrrolidine, tetrahydrofuran, tetrahydrothiophene, pyrrole, furan, thiophene, imidazole, pyrazole, oxazole, thiazole, imidazoline or the like. The monocyclic structure having a six-membered ring includes, for example, piperidine, tetrahydropyran, tetrahydrothiopyran, pyridine, pyrazine, morpholine, thiazine or the like. The monocyclic structure having a seven-membered ring includes, for example, azepane, oxepane, thiepane, azepine, oxepine, thiepine or the like. The structure having a fused ring includes, for example, indole, isoindole, benzoimidazole, purine, quinoline, isoquinoline, quinoxaline, cinnoline, pteridin, chromene, isochromene or the like. The aromatic heterocyclic structure such as pyrrole, furan or thiophene is preferred.

(d) The carboxylic acid having the heterocyclic ring can be a compound containing only a carboxyl group as a substituent group in the heterocyclic structure, or a compound containing another substituent group directly bonding to the heterocyclic structure in addition to the carboxyl group. The substituent group can bond to nitrogen atom contained in the heterocyclic structure. The substituent group includes, for example, halogen, a hydroxyl group, mercapto group, alkyl group, aryl group, aralkyl group, alkylaryl group, alkoxyl group, amino group which may be substituted, cyano group, and thiocarboxyl group.

The halogen includes, for example, fluorine, chlorine, bromine, and iodine.

The alkyl group includes a methyl group, ethyl group, propyl group, butyl group, pentyl group, hexyl group, heptyl group, octyl group, nonyl group, decyl group, or the like. Among them, preferred is an alkyl group having 1 to 6 carbon atoms, and more preferred is an alkyl group having 1 to 4 carbon atoms. The aryl group includes a phenyl group, naphthyl group, anthryl group, biphenyl group, phenanthryl group, fluorenyl group or the like, and among them, phenyl group is preferred. The aralkyl group includes a benzyl group, phenethyl group, phenylpropyl group, naphthylmethyl group, naphthylethyl group or the like. The alkylaryl group includes a tolyl group, xylyl group, cumenyl group, mesityl group or the like.

The alkoxyl group includes a methoxy group, ethoxy group, propoxy group, butoxy group, pentyloxy group, hexyloxy group, heptyloxy group, octyloxy group, nonyloxy group, and decyloxy group. Among them, preferred is an alkoxyl group having 1 to 6 carbon atoms, and more preferred is an alkoxyl group having 1 to 4 carbon atoms.

The amino group which may be substituted preferably includes an amino group where one or more hydrogen atoms in the amino group are substituted with an alkyl group or aryl group. The amino group which may be substituted includes a methylamino group, dimethylamino group, ethylamino group, propylamino group, isopropylamino group, butylamino group, isobutylamino group, tert-butylamino group, pentylamino group, hexylamino group, 2-ethylhexylamino group, phenylamino group, diphenylamino group, and naphthylamino group.

The cation component of (d) the salt of the carboxylic acid having the heterocyclic ring may be any one of an ammonium ion, a metal ion and an organic cation. The metal ion includes, for example, a monovalent metal ion such as sodium, potassium, lithium, silver or the like; a bivalent metal ion such as magnesium, calcium, zinc, barium, cadmium, copper, cobalt, nickel, manganese or the like; a trivalent metal ion such as aluminum or iron, and other metal ion such as tin, zirconium, titanium or the like. The metal ion preferably includes zinc ion. The cation may be used alone or as a mixture of at least two of them.

The organic cation is a cation having a carbon chain. The organic cation includes, for example, without limitation, an organic ammonium ion. Examples of the organic ammonium ion are: a primary ammonium ion such as stearyl ammonium ion, hexyl ammonium ion, octyl ammonium ion, 2-ethylhexyl ammonium ion, or the like; a secondary ammonium ion such as dodecyl(lauryl) ammonium ion, octadecyl(stearyl) ammonium ion, or the like; a tertiary ammonium ion such as trioctyl ammonium ion, or the like; and a quaternary ammonium ion such as dioctyldimethyl ammonium ion, distearyldimethyl ammonium ion, or the like. The organic cation may be used alone or as a mixture of at least two of them.

Specific examples of (d) the carboxylic acid having the heterocyclic ring and/or the salt thereof include, for example, a carboxylic acid having a three-membered heterocyclic ring such as aziridinecarboxylic acid, glycidic acid, thiiranecarboxylic acid, or oxirenecarboxylic acid; a carboxylic acid having a four-membered heterocyclic ring such as azetidinecarboxylic acid, oxetancarboxylic acid, thietanecarboxylic acid or the like; a carboxylic acid having a five-membered heterocyclic ring such aspyrrolidinecarboxylic acid, tetrahydrofurancarboxylic acid, tetrahydrothiophenecarboxylic acid, pyrrolecarboxylic acid, furancarboxylic acid, thiophenecarboxylic acid (2-thenoic acid), imidazolecarboxylic acid, pyrazolecarboxylic acid, oxazolecarboxylic acid, thiazolecarboxylic acid or the like; a carboxylic acid having a six-membered heterocyclic ring such as piperidinecarboxylic acid, tetrahydropyrancarboxylic acid, tetrahydrothiopyrancarboxylic acid, pyridinecarboxylic acid, pyrazinecarboxylic acid, morpholinecarboxylic acid or the like; a carboxylic acid having a seven-membered heterocyclic ring such as hexamethyleneiminecarboxylic acid, oxepanecarboxylic acid or the like; a carboxylic acid having a fused heterocyclic ring such as indolecarboxylic acid, isoindolecarboxylic acid, benzoimidazolecarboxylic acid, quinolinecarboxylic acid, isoquinolinecarboxylic acid, benzopyrancarboxylic acid or the like; and the salt thereof. (d) The carboxylic acid having a heterocyclic ring and/or the salt thereof may be used solely or in combination at least two of them.

Among them, (d) the carboxylic acid having the heterocyclic ring and/or the salt thereof is preferably a compound which has one heteroatom as a constituent atom of the heterocyclic ring and a carboxyl group bonding at the 2-position or 3-position of the heteroatom in the heterocyclic ring, and is more preferably a compound which has one heteroatom as a constituent atom of the heterocyclic ring and a carboxyl group bonding at the 2-position of the heteroatom in the heterocyclic ring. It is considered that, when the carboxyl group exists near the heteroatom, the cation exchange reaction proceeds more smoothly due to the action between the unshared electron pair of the heteroatom and the unshared electron pair of oxygen atom in the carboxyl group.

Specifically, (d) the carboxylic acid having the heterocyclic ring and/or the salt thereof preferably includes the compound represented by the formula (1) or (2), and/or the salt thereof.

(1)

(wherein, $R^1$ to $R^4$ each independently represent a hydrogen atom, a carboxyl group, halogen, a hydroxyl group, a mercapto group, an alkyl group, an aryl group, an aralkyl group, an alkylaryl group, an alkoxyl group, an amino group which may be substituted, a cyano group, or a thiocarboxyl group, and at least one of $R^1$ to $R^4$ is a carboxyl group.)

(2)

(wherein, $R^5$ to $R^8$ each independently represent a hydrogen atom, a carboxyl group, halogen, a hydroxyl group, a mercapto group, an alkyl group, an aryl group, an aralkyl group, an alkylaryl group, an alkoxyl group, an amino group which may be substituted, a cyano group, or a thiocarboxyl group, and at least one of $R^5$ to $R^8$ is a carboxyl group.)

The compound represented by the formula (1) includes, for example, 2-furancarboxylic acid, 3-furancarboxylic acid, 5-chlorofuran-2-carboxylic acid, 5-bromofuran-2-carboxylic acid, 5-iodofuran-2-carboxylic acid, 4,5-dibromo-2-furancarboxylic acid, 3,5-dibromo-2-furancarboxylic acid, 3-methyl-2-furancarboxylic acid, 2-methyl-3-furancarboxylic acid, 5-methyl-2-furancarboxylic acid, 2,4-dimethyl-3-furancarboxylic acid, 2,5-dimethyl-3-furancarboxylic acid, 5-phenyl-2-furancarboxylic acid, 5-(hydroxymethyl)furan-2-carboxylic acid, 5-benzyl-3-(hydroxymethyl)-2-furancarboxylic acid, 5-methoxymethyl-2-furancarboxylic acid, 2-ethoxymethyl-5-methyl-3-furancarboxylic acid, 5-(ethoxymethyl)-2-methyl-3-furancarboxylic acid, 5-aminofuran-2-carboxylic acid, and the like.

The compound represented by the formula (2) includes, for example, 2-thenoic acid, 3-thenoic acid, 5-chlorothiophene-2-carboxylic acid, 5-bromothiophene-2-carboxylic acid, 5-iodothiophene-2-carboxylic acid, 3,5-dibromo-2-thiophenecarboxylic acid, 2,4,5-tribromo-3-thiophenecarboxylic acid, 3-hydroxy-2-thiophenecarboxylic acid, 4-hydroxy-2-thiophenecarboxylic acid, 3-methylthiophene-2-carboxylic acid, 4-methylthiophene-2-carboxylic acid, 5-methyl-3-thiophenecarboxylic acid, 5-methyl-2-thiophenecarboxylic acid, 5-phenylthiophene-2-carboxylic acid, 5-benzyl-2-thiophenecarboxylic acid, 4-benzyl-2-thiophenecarboxylic acid, 3-benzyl-2-thiophenecarboxylic acid, 3-methoxythiophene-2-carboxylic acid, 5-(methoxymethyl)-2-thiophenecarboxylic acid, 5-amino-2-thiophenecarboxylic acid, and the like.

A mass ratio ((d)/(b)) of (d) the carboxylic acid having the heterocyclic ring and/or the salt thereof to (b) the α,β-unsaturated carboxylic acid having 3 to 8 carbon atoms and/or the metal salt thereof is preferably 0.02 or more, more preferably 0.03 or more, even more preferably 0.04 or more, and is preferably 0.67 or less, more preferably 0.4 or less, even more preferably 0.25 or less. If the mass ratio ((d)/(b)) is 0.02 or more, the effect of lowering the spin rate by (d) the carboxylic acid having the heterocyclic ring and/or the salt thereof becomes large, and if the mass ratio ((d)/(b)) is 0.67 or less, lowering the hardness of the core is suppressed, and thus the rebound resilience becomes better.

The content of (d) the carboxylic acid having a heterocyclic ring and/or the salt thereof is preferably 1.0 part by mass or more, more preferably 1.2 parts by mass or more, and is preferably 10 parts by mass or less, more preferably 9 parts by mass or less, even more preferably 8 parts by mass or less, with respect to 100 parts by mass of (a) the base rubber. If the content of (d) the carboxylic acid having the heterocyclic ring and/or the salt thereof is less than 1.0 part by mass, the effect of adding (d) the carboxylic acid having the heterocyclic ring and/or the salt thereof tends to be insufficient because of the low amount, and if the content of (d) the carboxylic acid having the heterocyclic ring and/or the salt is more than 10 parts by mass, the resilience of the core may be lowered, since the hardness of the resultant core may be lowered as a whole.

In the case that the rubber composition used in the present invention contains only the α,β-unsaturated carboxylic acid having 3 to 8 carbon atoms as the co-crosslinking agent, the rubber composition further contains (e) the metal compound as an essential component. (e) The metal compound is not limited as long as it can neutralize (b) the α,β-unsaturated carboxylic acid having 3 to 8 carbon atoms in the rubber composition. (e) The metal compound includes, for example, a metal hydroxide such as magnesium hydroxide, zinc hydroxide, calcium hydroxide, sodium hydroxide, lithium hydroxide, potassium hydroxide, copper hydroxide, or the like; a metal oxide such as magnesium oxide, calcium oxide, zinc oxide, copper oxide, or the like; a metal carbonate such as magnesium carbonate, zinc carbonate, calcium carbonate, sodium carbonate, lithium carbonate, potassium carbonate, or the like. Among these, (e) the metal compound preferably includes a divalent metal compound, more preferably includes a zinc compound. The divalent metal compound reacts with the α,β-unsaturated carboxylic acid having 3 to 8 carbon atoms, thereby forming a metal crosslinking. Use of the zinc compound provides a golf ball with excellent resilience. (e) The metal compound can be used solely or as a mixture of at least two of them. The content of (e) the metal compound may be appropriately determined in accordance with the desired degree of neutralization of (b) the α,β-unsaturated carboxylic acid having 3 to 8 carbon atoms.

The rubber composition used in the present invention preferably further contains (f) an organic sulfur compound. By using (d) the carboxylic acid having the heterocyclic ring and/or the salt thereof and (f) the organic sulfur compound in combination for the rubber composition, the degree of the outer-hard and inner-soft structure of the core can be controlled to a higher extent.

(f) The organic sulfur compound is not particularly limited, as long as it is an organic compound having a sulfur atom in the molecule thereof. Examples thereof include an organic compound having a thiol group (—SH) or a polysulfide bond having 2 to 4 sulfur atoms (—S—S—, —S—S—S—, or —S—S—S—S—), and a metal salt thereof (—SM, —S-M-S—, —S-M-S—S—, —S—S-M-S—S—, —S-M-S—S—S—, or the like; M is a metal atom). Examples of the metal salt include a monovalent metal salt such as sodium, lithium, potassium, copper (I), and silver (I) or the like, and a divalent metal salt such as zinc, magnesium, calcium, strontium, barium, titanium (II), manganese (II), iron (II), cobalt (II), nickel (II), zirconium (II), tin (II) or the like. Furthermore, (f) the organic sulfur compound may be any one of an aliphatic compound (aliphatic thiol, aliphatic thiocarboxylic acid, aliphatic dithiocarboxylic acid, aliphatic polysulfide, or the like), heterocyclic compound, alicyclic compound (alicyclic thiol, alicyclic thiocarboxylic acid, alicyclic dithiocarboxylic acid, alicyclic polysulfide, or the like), and aromatic compound.

(f) The organic sulfur compound includes, for example, thiols (thiophenols and thionaphthols), polysulfides, thiocarboxylic acids, dithiocarboxylic acids, sulfenamides, thiurams, dithiocarbamates, and thiazoles.

Examples of the thiols include, for example, thiophenols and thionaphthols. The thiophenols include, for example, thiophenol; thiophenols substituted with a fluoro group, such as 2-fluorothiophenol, 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 2-bromothiophenol, 4-bromothiophenol, 2,4-dibromothiophenol, 2,5-dibromothiophenol, 2,6-dibromothiophenol, 2,4,5-tribromothiophenol, 2,4,5,6-tetrabromothiophenol, pentabromothiophenol and the like; thiophenols substituted with an iodo group, such as 2-iodothiophenol, 4-iodothiophenol, 2,4-diiodothiophenol, 2,5-diiodothiophenol, 2,6-diiodothiophenol, 2,4,5-triiodothiophenol, 2,4,5,6-tetraiodothiophenol, pentaiodothiophenol and the like; or a metal salt thereof. As the metal salt, zinc salt is preferred.

Examples of the thionaphthols(naphthalenethiols) are 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, or the metal salt thereof.

Examples of the metal salt are a monovalent metal salt such as sodium, lithium, potassium, copper (I), silver (I) or the like, and a divalent metal salt such as zinc, magnesium, calcium, strontium, barium, titanium (II), manganese (II), iron (II), cobalt (II), nickel (II), zirconium (II), and tin (II) or the like, and preferred is the divalent metal salt, more preferred is the zinc salt. Specific examples of the metal salt are, for example, the zinc salt of 1-thionaphthol and zinc salt of 2-thionaphthol.

The polysulfides are organic sulfur compounds having a polysulfide bond, and include, for example, disulfides, trisulfides, and tetrasulfides. The polysulfides preferably include diphenylpolysulfides represented by the formula (3).

(3)

(wherein, $R^{11}$ to $R^{20}$ each independently represent H or a substituent group, and n represents an integer number of 2 to 4.)

In the above formula (3), the substituent group is at least one selected from the group consisting of a halogen group (F, Cl, Br, I), an alkyl group, a carboxyl group (—COOH) or an ester thereof (—COOR), a formyl group (—CHO), an acyl group (—COR), a halogenated carbonyl group (—COX), a sulfo group (—SO$_3$H) or an ester thereof (—SO$_3$R), a halogenated sulfonyl group (—SO$_2$X), a sulfino group (—SO$_2$H), an alkylsulfinyl group (—SOR), a carbamoyl group (—CONH$_2$), a halogenated alkyl group, a cyano group (—CN), and an alkoxy group (—OR). R represents an alkyl group, and is preferably an alkyl group having 1 to 5 carbon atoms. In the formula (3), n is preferably 2 or 3, more preferably 2 (diphenyldisulfides).

Examples of the organic sulfur compound represented by the formula (3) include: diphenyldisulfide; and a compound substituted with one kind of a substituent group, such as diphenyldisulfides substituted with a halogen group, such as bis(2-fluorophenyl)disulfide, bis(4-fluorophenyl)disulfide, bis(2,4-difluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(2-chlorophenyl)disulfide, bis(4-chlorophenyl)disulfide, bis(2,4-dichlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(2-bromophenyl)disulfide, bis(4-bromophenyl)disulfide, bis(2,4-dibromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(2-iodophenyl)disulfide, bis(4-iodophenyl)disulfide, bis(2,4-diiodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, bis(pentaiodophenyl)disulfide; diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, bis(penta-t-butylphenyl)disulfide; diphenyldisulfides substituted with a carboxyl group, such as bis(4-carboxyphenyl)disulfide, bis(2,4,6-tricarboxyphenyl)disulfide, bis(pentacarboxyphenyl)disulfide; diphenyldisulfides substituted with an alkoxycarbonyl group, such as bis(4-methoxycarbonylphenyl)disulfide, bis(2,4,6-trimethoxycarbonylphenyl)disulfide, bis(pentamethoxycarbonylphenyl)disulfide; diphenyldisulfides substituted with a formyl group, such as bis(4-formylphenyl)disulfide, bis(2,4,6-triformylphenyl)disulfide, bis(pentaformylphenyl)disulfide; diphenyldisulfides substituted with an acyl group, such as bis(4-acetylphenyl)disulfide, bis(2,4,6-triacetylphenyl)disulfide, bis(pentaacetylphenyl)disulfide; diphenyldisulfides substituted with a halogenated carbonyl group, such as bis(4-chlorocarbonylphenyl)disulfide, bis(2,4,6-tri(chlorocarbonyl)phenyl)disulfide, bis(penta(chlorocarbonyl)phenyl)disulfide; diphenyldisulfides substituted with a sulfo group, such as bis(4-sulfophenyl)disulfide, bis(2,4,6-trisulfophenyl)disulfide, bis(pentasulfophenyl)disulfide; diphenyldisulfides substituted with an alkoxysulfonyl group, such as bis(4-methoxysulfonylphenyl)disulfide, bis(2,4,6-trimethoxysulfonylphenyl)disulfide, bis(pentamethoxysulfonylphenyl)disulfide; diphenyldisulfides substituted with a halogenated sulfonyl group, such as bis(4-chlorosulfonylphenyl)disulfide, bis(2,4,6-tri(chlorosulfonyl)phenyl)disulfide, bis(penta(chlorosulfonyl)phenyl)disulfide; diphenyldisulfides substituted with a sulfino group, such as bis(4-sulfinophenyl)disulfide, bis(2,4,6-trisulfinophenyl)disulfide, bis(pentasulfinophenyl)disulfide; diphenyldisulfides substituted with an alkylsulfinyl group, such as bis(4-methylsulfinylphenyl)disulfide, bis(2,4,6-tri(methylsulfinyl)phenyl)disulfide, bis(penta(methylsulfinyl)phenyl)disulfide; diphenyldisulfides substituted with a carbamoyl group, such as bis(4-carbamoylphenyl)disulfide, bis(2,4,6-tricarbamoylphenyl)disulfide, bis(pentacarbamoylphenyl)disulfide; diphenyldisulfides substituted with a halogenated alkyl group, such as bis(4-trichloromethylphenyl)disulfide, bis(2,4,6-tri(trichloromethyl)phenyl)disulfide, bis(penta(trichloromethyl)phenyl)disulfide; diphenyldisulfides substituted with a cyano group, such as bis(4-cyanophenyl)disulfide, bis(2,4,6-tricyanophenyl)disulfide, bis(pentacyanophenyl)disulfide; diphenyldisulfides substituted with an alkoxy group, such as bis(4-methoxyphenyl)disulfide, bis(2,4,6-trimethoxyphenyl)disulfide, bis(pentamethoxyphenyl)disulfide; and the like.

The organic sulfur compound represented by the formula (3) includes a compound substituted with another substituent group, such as a nitro group (—NO$_2$), an amino group (—NH$_2$), a hydroxyl group (—OH), a phenylthio group (—SPh) or the like, in addition to at least one of one kind of the substituent group described above. Examples thereof include bis(4-chloro-2-nitrophenyl)disulfide, bis(4-chloro-2-aminophenyl)disulfide, bis(4-chloro-2-hydroxyphenyl)disulfide, bis(4-chloro-2-phenylthiophenyl)disulfide, bis(4-methyl-2-nitrophenyl)disulfide, bis(4-methyl-2-aminophenyl)disulfide, bis(4-methyl-2-hydroxyphenyl)disulfide, bis(4-methyl-2-phenylthiophenyl)disulfide, bis(4-carboxy-2-nitrophenyl)disulfide, bis(4-carboxy-2-aminophenyl)disulfide, bis(4-carboxy-2-hydroxyphenyl)disulfide, bis(4-carboxy-2-phenylthiophenyl)disulfide, bis(4-methoxycarbonyl-2-nitrophenyl)disulfide, bis(4-methoxycarbonyl-2-aminophenyl)disulfide, bis(4-methoxycarbonyl-2-hydroxyphenyl)disulfide, bis(4-methoxycarbonyl-2-phenylthiophenyl)disulfide, bis(4-formyl-2-nitrophenyl)disulfide, bis(4-formyl-2-aminophenyl)disulfide, bis(4-formyl-2-hydroxyphenyl)disulfide, bis(4-formyl-2-phenylthiophenyl)disulfide, bis(4-acetyl-2-nitrophenyl)disulfide, bis(4-acetyl-2-aminophenyl)disulfide, bis(4-acetyl-2-hydroxyphenyl)disulfide, bis(4-acetyl-2-phenylthiophenyl)disulfide, bis(4-chlorocarbonyl-2-nitrophenyl)disulfide, bis(4-chlorocarbonyl-2-aminophenyl)disulfide, bis(4-chlorocarbonyl-2-hydroxyphenyl)disulfide, bis(4-chlorocarbonyl-2-phenylthiophenyl)disulfide, bis(4-sulfo-2-nitrophenyl)disulfide, bis(4-sulfo-2-aminophenyl)disulfide, bis(4-sulfo-2-hydroxyphenyl)disulfide, bis(4-sulfo-2-phenylthiophenyl)disulfide, bis(4-methoxysulfonyl-2-nitrophenyl)disulfide, bis(4-methoxysulfonyl-2-aminophenyl)disulfide, bis(4-methoxysulfonyl-2-hydroxyphenyl)disulfide, bis(4-methoxysulfonyl-2-phenylthiophenyl)disulfide, bis(4-chlorosulfonyl-2-nitrophenyl)disulfide, bis(4-chlorosulfonyl-2-aminophenyl)disulfide, bis(4-chlorosulfonyl-2-hydroxyphenyl)disulfide, bis(4-chlorosulfonyl-2-phenylthiophenyl)disulfide, bis(4-sulfino-2-nitrophenyl)disulfide, bis(4-sulfino-2-aminophenyl)disulfide, bis(4-sulfino-2-hydroxyphenyl)disulfide, bis(4-sulfino-2-phenylthiophenyl)disulfide, bis(4-methylsulfinyl-2-nitrophenyl)disulfide, bis(4-methylsulfinyl-2-aminophenyl)disulfide, bis(4-methylsulfinyl-2-hydroxyphenyl)disulfide, bis(4-methylsulfinyl-2-phenylthiophenyl)disulfide, bis(4-carbamoyl-2-nitrophenyl)disulfide, bis(4-carbamoyl-2-aminophenyl)disulfide, bis(4-carbamoyl-2-hydroxyphenyl)disulfide, bis(4-carbamoyl-2-phenylthiophenyl)disulfide, bis(4-trichloromethyl-2-nitrophenyl)disulfide, bis(4-trichloromethyl-2-aminophenyl)disulfide, bis(4-trichloromethyl-2-hydroxyphenyl)disulfide, bis(4-trichloromethyl-2-phenylthiophenyl)disulfide, bis(4-cyano-2-nitrophenyl)disulfide, bis(4-cyano-2-aminophenyl)disulfide, bis(4-cyano-2-hydroxyphenyl)disulfide, bis(4-cyano-2-phenylthiophenyl)disulfide, bis(4-methoxy-2-nitrophenyl)disulfide, bis(4-methoxy-2-aminophenyl)disulfide, bis(4-methoxy-2-hydroxyphenyl)disulfide, bis(4-methoxy-2-phenylthiophenyl)disulfide and the like.

The organic sulfur compound represented by the formula (3) includes a compound substituted with two or more of the substituent groups described above. Examples thereof include bis(4-acetyl-2-chlorophenyl)disulfide, bis(4-acetyl-2-methylphenyl)disulfide, bis(4-acetyl-2-carboxyphenyl)disulfide, bis(4-acetyl-2-methoxycarbonylphenyl)disulfide, bis(4-acetyl-2-formylphenyl)disulfide, bis(4-acetyl-2-chlorocarbonylphenyl)disulfide, bis(4-acetyl-2-sulfophenyl)disulfide, bis(4-acetyl-2-methoxysulfonylphenyl)disulfide, bis(4-acetyl-2-chlorosulfonylphenyl)disulfide, bis(4-acetyl-2-sulfinophenyl)disulfide, bis(4-acetyl-2-methylsulfinylphenyl)disulfide, bis(4-acetyl-2-carbamoylphenyl)disulfide, bis(4-acetyl-2-trichloromethylphenyl)disulfide, bis(4-acetyl-2-cyanophenyl)disulfide, bis(4-acetyl-2-methoxyphenyl)disulfide and the like.

The thiocarboxylic acids include, for example, a naphthalenethiocarboxylic acid. The dithiocarboxylic acids include, for example, a naphthalenedithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

The thiurams include, for example, thiurammonosulfides such as tetramethylthiuram monosulfide; thiuramdisulfides such as tetramethylthiuram disulfide, tetraethylthiuram disulfide, tetrabutylthiuram disulfide; and thiuram tetrasulfides such as dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbamate, iron (III) dimethyldithiocarbamate, selenium diethyldithiocarbamate, and tellurium diethyldithiocarbamate. The thiazoles include, for example, 2-mercaptobenzothiazole (MBT), dibenzothiazyl disulfide (MBTS), sodium salt, zinc salt, copper salt or cyclohexylamine salt of 2-mercaptobenzothiazole, 2-(2,4-dinitrophenyl) mercaptobenzothiazole, and 2-(2,6-diethyl-4-morpholinothio)benzothiazole.

(f) The organic sulfur compound preferably includes thiophenols and/or the salt thereof, thionaphthols and/or the salt thereof, diphenyldisulfides and thiuramdisulfides, and more preferably 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl)disulfide.

The content of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (f) the organic sulfur compound is less than 0.05 part by mass, the effect of adding (f) the organic sulfur compound cannot be obtained and thus the resilience may not be enhanced. If the content of (f) the organic sulfur compound exceeds 5.0 parts by mass, the compression deformation amount of the obtained golf ball becomes large and thus the resilience may be lowered.

In the case of blending (f) the organic sulfur compound, a mass ratio ((d)/(f)) of (d) the carboxylic acid having the heterocyclic ring and/or the salt thereof to (f) the organic sulfur compound is preferably 2 or more, more preferably 5 or more, even more preferably 10 or more, and is preferably 100 or less, more preferably 90 or less, even more preferably 80 or less.

The rubber composition used in the present invention may include an additive such as a pigment, a filler for adjusting weight or the like, an antioxidant, a peptizing agent, and a softener where necessary. Examples of the pigment blended in the rubber composition include a white pigment, a blue pigment, and a purple pigment.

As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, or the like. Zinc oxide is preferably used as the filler. It is considered that zinc oxide functions as a vulcanization activator and increases the hardness of the entire core. The content of the filler is preferably 0.5 part by mass or more, more preferably 1 part by mass or more, and is preferably 30 parts by mass or less, more preferably 25 parts by mass or less, even more preferably 20 parts by mass or less, with respect to 100 parts by mass of the base rubber. If the content of the filler is less than 0.5 part by mass, it is difficult to adjust the weight, while if the content of the filler exceeds 30 parts by mass, the weight ratio of the rubber component is reduced and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

The rubber composition used in the present invention is obtained by mixing and kneading (a) the base rubber, (b) the α,β-unsaturated carboxylic acid having 3 to 8 carbon atoms and/or the metal salt thereof, (c) the crosslinking initiator, and (d) the carboxylic acid having the heterocyclic ring and/or the salt thereof, and other additives where necessary. The kneading can be conducted, without any limitation, with a well-known kneading machine such as a kneading roll, a banbury mixer, a kneader, or the like.

The spherical core of the golf ball of the present invention can be obtained by molding the rubber composition after kneaded. The temperature for molding the spherical core is preferably 120° C. or more, more preferably 150° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

The spherical core preferably has a hardness difference (Hs−Ho) between a surface hardness Hs and a center hardness Ho of 25 or more, more preferably 27 or more, even more preferably 30 or more, and preferably has a hardness difference of 80 or less, more preferably 70 or less, even more preferably 60 or less in JIS-C hardness. If the hardness difference between the surface hardness and the center hardness is large, the golf ball having a great flight distance due to the high launch angle and low spin rate is obtained.

The spherical core preferably has the center hardness Ho of 30 or more, more preferably 40 or more, even more preferably 45 or more in JIS-C hardness. If the center hardness Ho is less than 30 in JIS-C hardness, the core becomes so soft that the resilience thereof may be lowered. Further, the spherical core preferably has the center hardness Ho of 70 or less, more preferably 65 or less, even more preferably 60 or less in JIS-C hardness. If the center hardness Ho exceeds 70 in JIS-C hardness, the core becomes so hard that the shot feeling thereof tends to be lowered.

The spherical core preferably has the surface hardness Hs of 76 or more, more preferably 78 or more, and preferably has the surface hardness Hs of 100 or less, more preferably 95 or less in JIS-C hardness. If the surface hardness is 76 or more in JIS-C hardness, the spherical core does not become excessively soft, and thus the better resilience is obtained. Further, if the surface hardness of the spherical core is 100 or less in JIS-C hardness, the spherical core does not become excessively hard, and thus the better shot feeling is obtained.

In a preferable embodiment, the spherical core is such that $R^2$ of a linear approximation curve obtained from a least square method is 0.85 or higher, when JIS-C hardness, which is measured at nine points obtained by dividing a radius of the spherical core into equal parts having a 12.5% interval therebetween, is plotted against the distance (%) from a core center.

The hardness of the spherical core is JIS-C hardness measured at nine points obtained by dividing a radius of the spherical core into equal parts having a 12.5% interval. That is, JIS-C hardness is measured at nine points, namely at distances of 0% (core center), 12.5%, 25%, 37.5%, 50%, 62.5%, 75%, 87.5%, 100% (core surface) from the core center. Next, the measurement results are plotted to make a graph having JIS-C hardness as a vertical axis and distance (%) from the core center as a horizontal axis. In the present invention, $R^2$ of a linear approximation curve obtained from this graph by the least square method is preferably 0.85 or higher. $R^2$ of the linear approximation curve obtained by the least square method indicates the linearity of the obtained plot. In the present invention, $R^2$ of 0.85 or higher means that, the spherical core has a hardness distribution where the hardness increases linearly or almost linearly. If the spherical core having the hardness distribution where the hardness increases linearly or almost linearly is used for the golf ball, the spin rate on driver shots decrease. As a result, the flight distance on driver shots increases. $R^2$ of the linear approximation curve is preferably 0.90 or higher, and more preferably 0.95 or higher. The higher linearity provides a greater flight distance on driver shots.

The spherical core preferably has a diameter of 34.8 mm or more, more preferably 36.8 mm or more, and even more preferably 38.8 mm or more, and preferably has a diameter of 42.2 mm or less, more preferably 41.8 mm or less, and even more preferably 41.2 mm or less, and most preferably 40.8 mm or less. If the spherical core has the diameter of 34.8 mm or more, the thickness of the cover does not become too thick and thus the resilience becomes better. On the other hand, if the spherical core has the diameter of 42.2 mm or less, the thickness of the cover does not become too thin, and thus the cover functions better.

When the spherical core has the diameter of from 34.8 mm to 42.2 mm, a compression deformation amount (a shrinking amount of the spherical core along the compression direction) of the spherical core when being applied a load from 98 N as an initial load to 1275 N as a final load is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better. If the compression deformation amount is 6.0 mm or less, the resilience of the golf ball becomes better.

The golf ball cover of the present invention is formed from a cover composition containing a resin component. Examples of the resin component include, for example, an ionomer resin; a thermoplastic polyurethane elastomer having a commercial name of "Elastollan (registered trademark)" commercially available from BASF Japan Ltd; a thermoplastic polyamide elastomer having a commercial name of "Pebax (registered trademark)" commercially available from Arkema K. K.; a thermoplastic polyester elastomer having a commercial name of "Hytrel (registered trademark)" commercially available from Du Pont-Toray Co., Ltd.; and a thermoplastic styrene elastomer having a commercial name of "Rabalon (registered trademark)" commercially available from Mitsubishi Chemical Corporation; and the like.

The ionomer resin includes a product prepared by neutralizing at least a part of carboxyl groups in a binary copolymer composed of an olefin and an α,β-unsaturated carboxylic acid having 3 to 8 carbon atoms with a metal ion, a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin preferably includes a metal ion-neutralized product of a binary copolymer composed of ethylene-(meth)acrylic acid and a metal ion-neutralized product of a ternary copolymer composed of ethylene-(meth)acrylic acid-(meth)acrylic acid ester.

Specific examples of the ionomer resin include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples of the ionomer resin also include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg), HPF 1000 (Mg), HPF 2000 (Mg))" commercially available from E.I. du Pont de Nemours and Company.

Further, examples of the ionomer resin also include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal ion type for neutralizing the ionomer resin. The ionomer resin may be used solely or in combination at least two of them.

The cover composition constituting the cover of the golf ball of the present invention preferably includes, as a resin component, a thermoplastic polyurethane elastomer or an ionomer resin. In case of using the ionomer resin, it is preferred to use a thermoplastic styrene elastomer together. The content of the polyurethane or ionomer resin in the resin component of the cover composition is preferably 50 mass % or more, more preferably 60 mass % or more, and even more preferably 70 mass % or more.

In the present invention, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover.

The content of the white pigment (for example, titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the content of the white pigment is 0.5 part by mass or more, it is possible to impart the opacity to the resultant cover. Further, if the content of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and preferably has a slab hardness of 80 or less, more preferably 70 or less in shore D hardness. If the cover composition has the slab hardness of 50 or more, the obtained golf ball has a high launch angle and low spin rate on driver shots and iron shots, and thus the flight distance becomes large. If the cover composition has the slab hardness of 80 or less, the golf ball excellent in durability is obtained.

Further, in case of a so-called spin golf ball which focuses on controllability, the cover composition preferably has a slab hardness of less than 50, and preferably has a slab hardness of 20 or more, more preferably 25 or more in shore D hardness. If the cover composition has the slab hardness of less than 50, the flight distance on driver shots can be improved by the core of the present invention, as well as the obtained golf ball readily stops on the green due to the high spin rate on approach shots. If the cover composition has the slab hardness of 20 or more, the abrasion resistance improves. In case of a plurality of cover layers, the slab hardness of the cover composition constituting each layer can be identical or different, as long as the slab hardness of each layer is within the above range.

An embodiment for molding the cover is not particularly limited, and includes an embodiment which comprises injection-molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression-molding method, molding of the half shell can be performed by either compression-molding method or injection-molding method, but the compression-molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include a method of covering the core with two half shells and then subjecting the core with the two half shells to the compression-molding. The compression-molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of injection-molding the cover composition, the cover composition extruded in a pellet form beforehand may be used for injection-molding, or the materials such as the base resin components and the pigment may be dry blended, followed by directly injection-molding the blended material. It is preferred to use upper and lower molds having a spherical cavity and pimples for forming the cover, wherein a part of the pimples also serves as a retractable hold pin. When molding the cover by injection-molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is ejected from the mold.

The concave portions called "dimple" are usually formed on the surface of the cover. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and another irregular shape. The shape of the dimples is employed solely or at least two of them may be used in combination.

In the present invention, the thickness of the cover of the golf ball is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

After the cover is molded, the mold is opened and the golf ball body is ejected from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

When the golf ball of the present invention has a diameter in a range from 40 mm to 45 mm, a compression deformation amount of the golf ball (a shrinking amount of the golf ball in the compression direction thereof) when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus exhibits good shot feeling. On the other hand, if the compression deformation amount is 5.0 mm or less, the resilience is enhanced.

Figure 1:
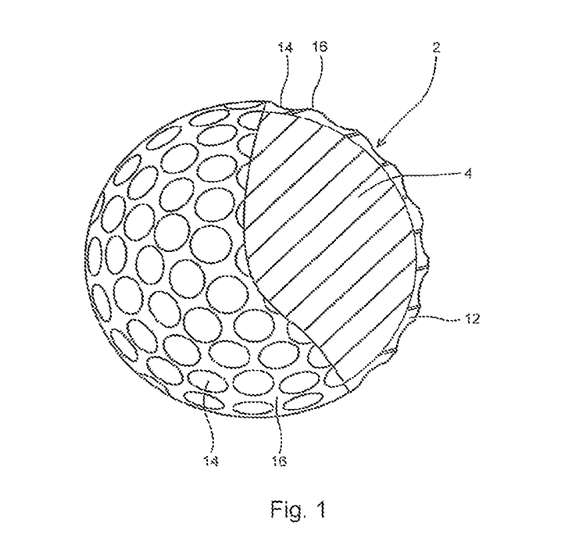
FIG. 1 is a partially cutaway sectional view showing the golf ball according to the preferable embodiment of the present invention.
Figure 2:
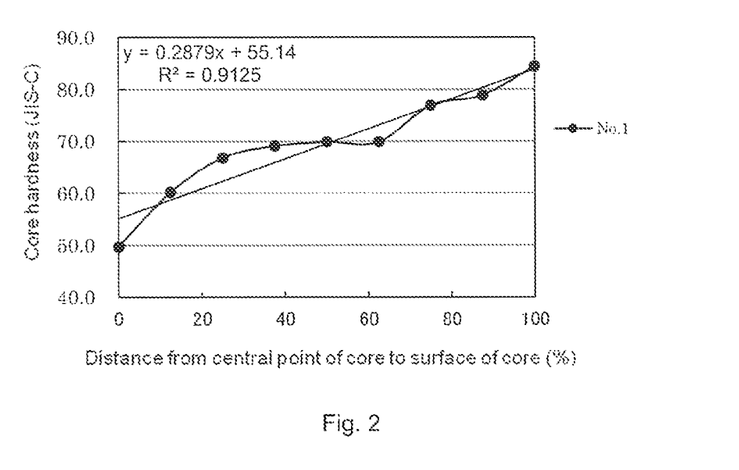
FIG. 2 is a graph showing the hardness distribution of the spherical core.
Figure 3:
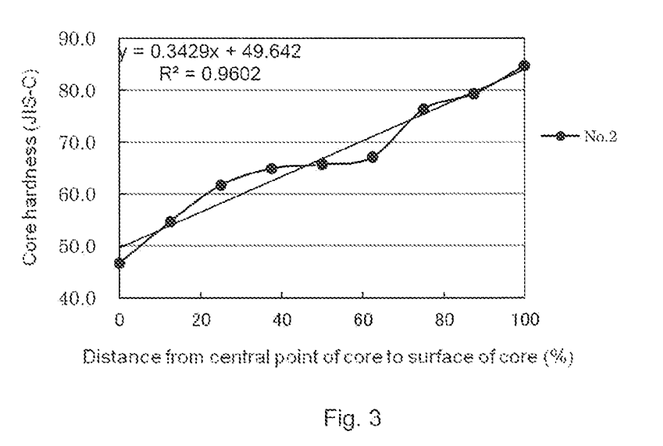
FIG. 3 is a graph showing the hardness distribution of the spherical core.
Figure 4:
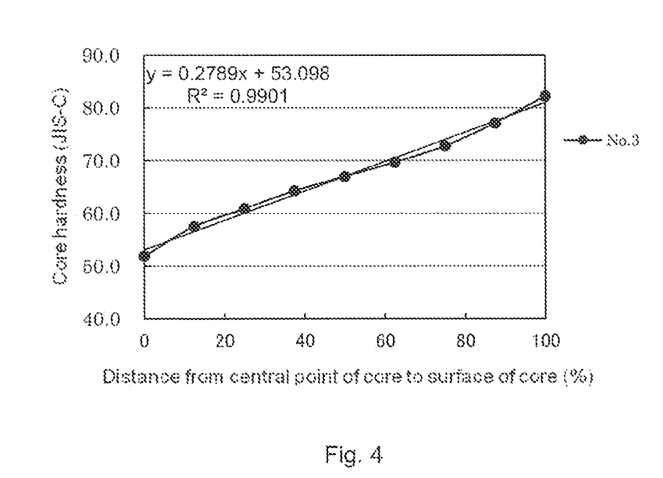
FIG. 4 is a graph showing the hardness distribution of the spherical core.
Figure 5:
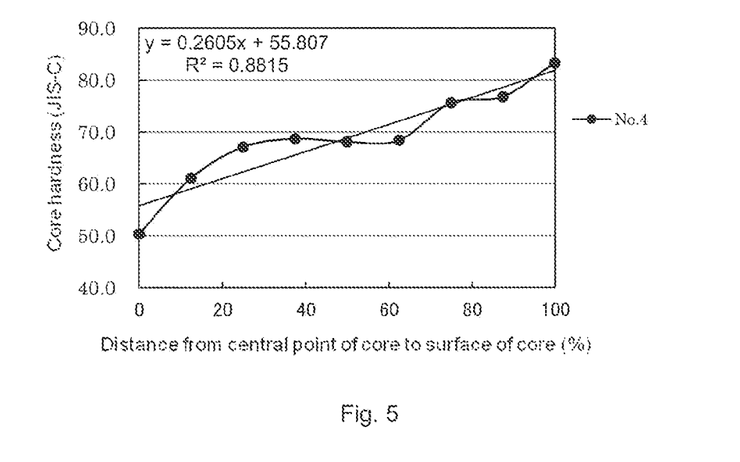
FIG. 5 is a graph showing the hardness distribution of the spherical core.
Figure 6:
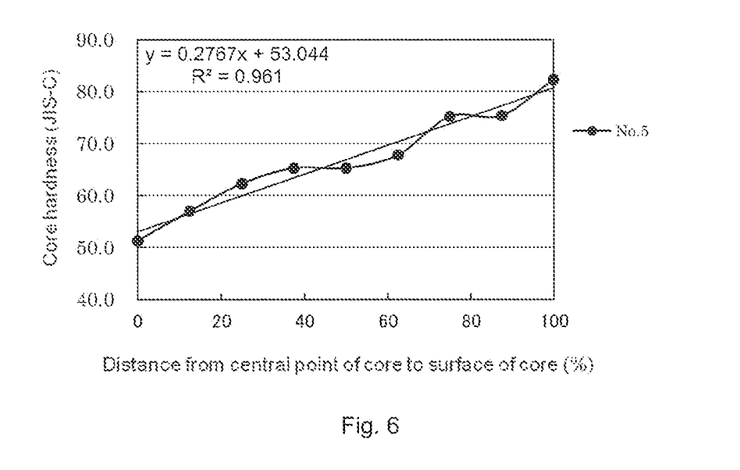
FIG. 6 is a graph showing the hardness distribution of the spherical core.
Figure 7:
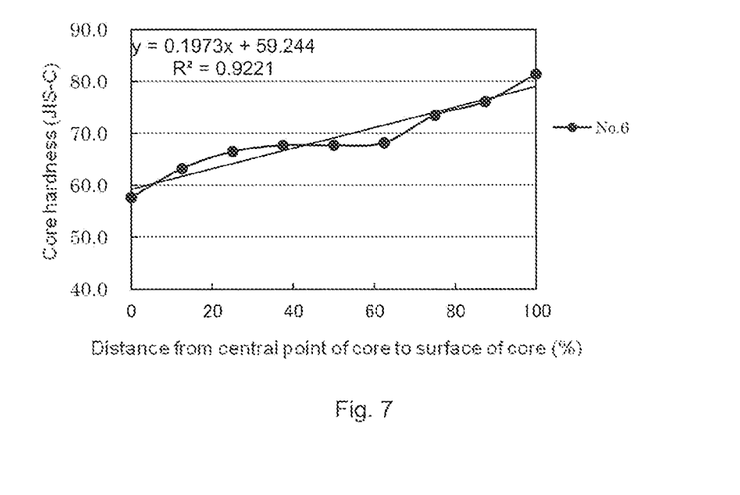
FIG. 7 is a graph showing the hardness distribution of the spherical core.
Figure 8:
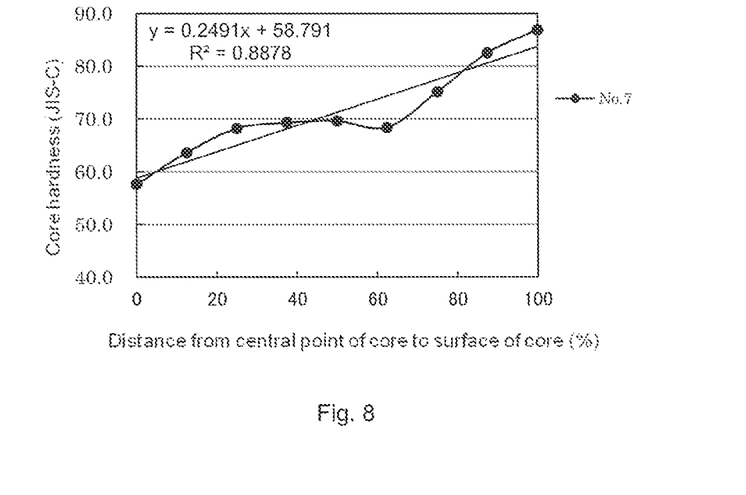
FIG. 8 is a graph showing the hardness distribution of the spherical core.

The golf ball construction of the present invention is not limited, as long as the golf ball comprises a spherical core and at least one cover layer covering the spherical core. FIG. 1 is a partially cutaway sectional view showing the golf ball 2 according to the preferable embodiment of the present invention. The golf ball 2 comprises a spherical core 4, and a cover 12 covering the spherical core 4. A plurality of dimples 14 are formed on the surface of the cover. Other portions than dimples 14 on the surface of the golf ball 2 are land 16. The golf ball 2 is provided with a paint layer and a mark layer outside the cover 12, but these layers are not depicted.

The spherical core preferably has a single layered structure. Unlike the multi-layered structure, the spherical core of the single layered structure does not have an energy loss at the interface of the multi-layered structure when being hit, and thus has an improved resilience. The cover has a structure of at least one layer, for example a single layered structure, or a multi-layered structure of at least two layers. The golf ball of the present invention includes, for example, a two-piece golf ball comprising a spherical core and a single layered cover disposed around the spherical core; a multi-piece golf ball comprising a spherical core and at least two cover layers disposed around the spherical core (including a three-piece golf ball); and a wound golf ball comprising a spherical core, a rubber thread layer which is formed around the spherical core, and a cover disposed over the rubber thread layer. The present invention can be suitably applied to any one of the above golf ball.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Compression Deformation Amount (mm)

A compression deformation amount of the core or golf ball (a shrinking amount of the core or golf ball in the compression direction thereof), when applying a load from 98 N as an initial load to 1275 N as a final load to the core or golf ball, was measured.

(2) Slab Hardness (Shore D Hardness)

Sheets with a thickness of about 2 mm were produced by injection-molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Hardness Distribution of Spherical Core (JIS-C Hardness)

A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness of the spherical core. The spherical core was cut into two hemispheres to obtain a cut plane, and the hardness was measured at the central point and at predetermined distances from the central point. The core hardness was measured at 4 points at predetermined distances from the central point of the cut plane of the core. The core hardness was calculated by averaging the hardness measured at the 4 points.

(4) Spin Rate (rpm) on Driver Shots

A metal-headed W#1 driver (XXIO, Shaft: S, loft: 11°, manufactured by Dunlop Sports Limited) was installed on a swing robot M/C manufactured by Golf Laboratories, Inc. A golf ball was hit at a head speed of 40 m/sec, and the spin rate right after hitting the golf ball were measured. This measurement was conducted twelve times for each golf ball, and the average value thereof was adopted as the measurement value for the golf ball. A sequence of photographs of the hit golf ball were taken for measuring the spin rate (rpm) right after hitting the golf ball. The spin rate on the driver shots of the golf ball are shown as a difference from those of the golf ball (core) No. 6.

[Production of Golf Ball]
(1) Production of Core

The rubber compositions having formulations shown in Table 3 were kneaded with a kneading roll and heat-pressed in upper and lower molds, each having a hemispherical cavity, at 170° C. for 20 minutes to prepare spherical cores having a diameter of 39.8 mm.

TABLE 3

| | | Golf ball No. | | | | | | |
|---|---|---|---|---|---|---|---|---|
| | | 1 | 2 | 3 | 4 | 5 | 6 | 7 |
| Rubber composition (part by mass) | BR730 | 100 | 100 | 100 | 100 | 100 | 100 | 100 |
| | Sanceler SR | 29 | 29 | 41 | 29 | 29 | 23 | 24 |
| | Zinc oxide | 5 | 5 | 5 | 5 | 5 | 5 | 5 |
| | Barium sulfate | *1) | *1) | *1) | *1) | *1) | *1) | *1) |
| | 2-Thionaphthol | 0.1 | 0.1 | 0.1 | 0.1 | 0.1 | — | 0.1 |
| | 2-Thenoic acid | 1.8 | 3.6 | 7.2 | — | — | — | — |
| | 2-Furancarboxylic acid | — | — | — | 1.6 | 3.1 | — | — |
| | Dicumyl peroxide | 0.8 | 0.8 | 0.8 | 0.8 | 0.8 | 0.8 | 0.8 |
| Core hardness distribution (JIS-C) | Center hardness | 49.7 | 46.7 | 51.9 | 50.4 | 51.3 | 57.7 | 57.6 |
| | 12.5% point hardness | 60.2 | 54.7 | 57.5 | 61.1 | 57.0 | 63.2 | 63.6 |
| | 25% point hardness | 66.8 | 61.7 | 60.9 | 67.1 | 62.3 | 66.5 | 68.2 |
| | 37.5% point hardness | 69.1 | 64.9 | 64.3 | 68.7 | 65.3 | 67.7 | 69.3 |
| | 50% point hardness | 69.9 | 65.7 | 67.0 | 68.1 | 65.3 | 67.7 | 69.6 |
| | 62.5% point hardness | 69.9 | 67.1 | 69.7 | 68.4 | 67.8 | 68.2 | 68.4 |

TABLE 3-continued

|  |  | Golf ball No. | | | | | | |
|---|---|---|---|---|---|---|---|---|
|  |  | 1 | 2 | 3 | 4 | 5 | 6 | 7 |
|  | 75% point hardness | 76.9 | 76.3 | 72.8 | 75.6 | 75.2 | 73.5 | 75.1 |
|  | 87.5% point hardness | 78.9 | 79.3 | 77.1 | 76.8 | 75.4 | 76.1 | 82.5 |
|  | Surface hardness | 84.4 | 84.7 | 82.2 | 83.3 | 82.3 | 81.4 | 86.9 |
|  | Surface hardness − center hardness | 34.7 | 38.0 | 30.3 | 32.9 | 31.0 | 23.7 | 29.3 |
|  | $R^2$ of approximated curve | 0.91 | 0.96 | 0.99 | 0.88 | 0.96 | 0.92 | 0.89 |
|  | Slope of approximated curve | 0.29 | 0.34 | 0.28 | 0.26 | 0.28 | 0.20 | 0.25 |
| Compression deformation amount of core (mm) |  | 4.00 | 4.20 | 4.10 | 3.95 | 4.17 | 4.29 | 4.00 |
| Cover hardness (Shore D) |  | 65 | 65 | 65 | 65 | 65 | 65 | 65 |
| Cover thickness (mm) |  | 1.5 | 1.5 | 1.5 | 1.5 | 1.5 | 1.5 | 1.5 |
| Golf | Driver spin rate (rpm) | −40 | −80 | −30 | −30 | −70 | 0 | −20 |
| Ball | Compression deformation amount (mm) | 3.30 | 3.50 | 3.40 | 3.25 | 3.47 | 3.59 | 3.30 |

*1) As to an amount of barium sulfate, adjustment was made such that the golf ball had a mass of 45.4 g.
BR730: a high-cis polybutadiene (cis-1,4 bond content = 96 mass %, 1,2-vinyl bond content = 1.3 mass %, Moony viscosity ($ML_{1+4}$ (100° C.) = 55, molecular weight distribution (Mw/Mn) = 3) available from JSR Corporation
Sanceler SR: zinc acrylate (product of 10 mass % stearic acid coating) available from Sanshin Chemical Industry Co., Ltd.
Zinc oxide: "Ginrei R" manufactured by Toho Zinc Co., Ltd.
Barium sulfate: "Barium sulfate BD" manufactured by Sakai Chemical Industry Co., Ltd., adjustment was made such that the finally obtained golf ball had a mass of 45.4 g.
2-thionaphthol: available from Tokyo Chemical Industry Co., Ltd.
2-Thenoic acid: available from Tokyo Chemical Industry Co., Ltd. (purity 98 mass % or more)
2-Furancarboxylic acid: available from Tokyo Chemical Industry Co., Ltd.(purity 98 mass % or more)
Dicumyl peroxide: "PERCUMYL ® D" available from NOF Corporation.

(2) Production of Cover

Cover materials shown in Table 4 were extruded with a twin-screw kneading extruder to prepare the cover composition in the pellet form. The extruding conditions of the cover composition were a screw diameter of 45 mm, a screw rotational speed of 200 rpm, and screw L/D=35, and the mixtures were heated to 150 to 230° C. at the die position of the extruder. The obtained cover composition was injection-molded onto the spherical core obtained above to produce the golf ball having the spherical core and the cover covering the spherical core.

TABLE 4

| Cover composition | | |
|---|---|---|
| Formulation | Himilan 1605 | 50 |
|  | Himilan 1706 | 50 |
|  | Titanium oxide | 4 |
| Slab hardness (shore D) |  | 65 |

Formulation: parts by mass
Himilan 1605: Sodium ion neutralized ethylene-methacrylic acid copolymer ionomer resin available from Du Pont-Mitsui Polychemicals Co., Ltd
Himilan 1706: Zinc ion neutralized ethylene-methacrylic acid copolymer ionomer resin available from Du Pont-Mitsui Polychemicals Co., Ltd

Apparent from the result in Table 3, the golf balls comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a carboxylic acid having a heterocyclic ring and/or a salt thereof, have a low spin rate on driver shots, respectively. It is expected that the golf ball having a low spin rate on driver shots travels a great flight distance.

The golf ball of the present invention has a low spin rate on the driver shots. This application is based on Japanese Patent application No. 2013-008547 filed on Jan. 21, 2013, the content of which are hereby incorporated by reference.

The invention claimed is:

1. A golf ball having a spherical core and at least one cover layer covering the spherical core, wherein the spherical core is formed from a rubber composition containing:

(a) a base rubber,
(b) an α,β-unsaturated carboxylic acid having 3 to 8 carbon atoms and/or a metal salt thereof as a co-crosslinking agent,
(c) a crosslinking initiator and
(d) a carboxylic acid having a heterocyclic ring and/or a salt thereof,
provided that the rubber composition further contains (e) a metal compound if only (b) the α,β-unsaturated carboxylic acid having 3 to 8 carbon atoms is present as the co-crosslinking agent,
wherein (d) the carboxylic acid having the heterocyclic ring and/or the salt thereof is a compound represented by the following formula (2), and/or the salt thereof:

(2)

wherein $R^5$ to $R^8$ each independently represent a hydrogen atom, a carboxyl group, halogen,
a hydroxyl group, an alkyl group, an aryl group, an aralkyl group,
an alkylaryl group, an alkoxyl group, an amino group which may be substituted, a cyano group,
or a thiocarboxyl group, and at least one of $R^5$ to $R^8$ is a carboxyl group.

2. The golf ball according to claim 1, wherein (d) the carboxylic acid having a heterocyclic ring and/or salt thereof is a compound which has a carboxyl group bonding at the 2-position or 3-position of the heteroatom in the heterocyclic ring.

3. The golf ball according to claim 1, wherein a content of (d) the carboxylic acid having a heterocyclic ring and/or salt thereof is 1 part to 10 parts by mass with respect to 100 parts by mass of (a) the base rubber.

4. The golf ball according to claim 1, wherein the rubber composition further contains (f) an organic sulfur compound.

5. The golf ball according to claim 4, wherein (f) the organic sulfur compound includes at least one compound selected from the group consisting of thiophenols and/or metal salts thereof, thionaphthols and/or metal salts thereof, diphenylpolysulfides and thiuramdisulfides.

6. The golf ball according to claim 4, wherein a content of (f) the organic sulfur compound is 0.05 part to 5 parts by mass with respect to 100 parts by mass of (a) the base rubber.

7. The golf ball according to claim 1, wherein a content of (b) the α,β-unsaturated carboxylic acid having 3 to 8 carbon atoms and/or the metal salt thereof is 15 parts to 50 parts by mass with respect to 100 parts by mass of (a) the base rubber.

8. The golf ball according to claim 1, wherein a mass ratio ((d)/(b)) of (d) the carboxylic acid having the heterocyclic ring and/or the salt thereof to (b) the α,β-unsaturated carboxylic acid having 3 to 8 carbon atoms and/or the metal salt thereof ranges from 0.02 to 0.67.

9. The golf ball according to claim 4, wherein a mass ratio ((d)/(f)) of (d) the carboxylic acid having the heterocyclic ring and/or the salt thereof to (f) the organic sulfur compound ranges from 2 to 100.

10. The golf ball according to claim 1, wherein the spherical core is such that if JIS-C hardness values are measured at nine points obtained by dividing a radius of the spherical core into equal parts having a 12.5% interval therebetween, and including the core center and core surface, and the hardness values are plotted against the distance (%) from the core center, then $R^2$ of a linear approximation curve obtained from a least square method is 0.85 or higher.

11. The golf ball according to claim 1, wherein the spherical core has a hardness difference (Hs−Ho) between a surface hardness Hs and a center hardness Ho thereof of 25 or more in JIS-C hardness.

* * * * *